(12) United States Patent
Zhu et al.

(10) Patent No.: US 11,762,879 B2
(45) Date of Patent: Sep. 19, 2023

(54) INFORMATION TRACEABILITY METHOD AND SYSTEM BASED ON BLOCKCHAIN

(71) Applicant: NANJING UNIVERSITY OF SCIENCE AND TECHNOLOGY, Jiangsu (CN)

(72) Inventors: Peng Zhu, Jiangsu (CN); Jun Wang, Jiangsu (CN)

(73) Assignee: Nanjing University of Science and Technology, Nanjing (CN)

( * ) Notice: Subject to any disclaimer, the term of this patent is extended or adjusted under 35 U.S.C. 154(b) by 0 days.

(21) Appl. No.: 18/048,824

(22) Filed: Oct. 21, 2022

(65) Prior Publication Data
US 2023/0126706 A1    Apr. 27, 2023

(30) Foreign Application Priority Data
Oct. 22, 2021    (CN) .......................... 202111231327.6

(51) Int. Cl.
| G06F 16/00 | (2019.01) |
| G06F 16/27 | (2019.01) |
| G06F 17/10 | (2006.01) |

(52) U.S. Cl.
CPC .............. G06F 16/27 (2019.01); G06F 17/10 (2013.01)

(58) Field of Classification Search
CPC ....................................................... G03F 16/27
See application file for complete search history.

(56) References Cited

U.S. PATENT DOCUMENTS

| 2020/0364817 | A1* | 11/2020 | Liu | ......................... H04L 67/04 |
| 2021/0281398 | A1* | 9/2021 | Mardinian | ............ G07F 7/1016 |
| 2022/0058578 | A1* | 2/2022 | Javaheri | ............... G06K 7/1443 |
| 2022/0335367 | A1* | 10/2022 | Wu | ....................... G06Q 20/203 |

FOREIGN PATENT DOCUMENTS

| CN | 110046841 A | 7/2019 |
| CN | 1111163064 A | 5/2020 |
| CN | 113918622   | 1/2022 |

* cited by examiner

Primary Examiner — Khanh B Pham
(74) Attorney, Agent, or Firm — EpiMED LLC (57) ABSTRACT

The present invention provides an information traceability method and system based on a blockchain. The method includes: receiving a traceability request, where the traceability request includes a type label, a time label, and a content label; accessing information path data pre-stored in the blockchain based on the type label to obtain target path data, where the target path data is single-source path data or multi-source path data; determining a corresponding primary data set based on the time label, where the target path data includes a plurality of primary data sets; determining a corresponding secondary data set based on the content label, where the primary data set includes at least one secondary data set; and extracting path information from the secondary data set, and obtaining at least one information source based on the path information. In the technical solution of the present invention, an information source can be quickly located based on different labels in the traceability request during information traceability, which reduces a volume of data traversed during searching for the information source, saves a time for searching for the information source, and has relatively high efficiency.

7 Claims, 2 Drawing Sheets

INFORMATION TRACEABILITY METHOD AND SYSTEM BASED ON BLOCKCHAIN

TECHNICAL FIELD

The present invention relates to the field of information processing technologies, and in particular, to an information traceability method and system based on a blockchain.

BACKGROUND

Information traceability includes single-source information traceability and multi-source information traceability.

Single-source information traceability refers to an issue of information traceability when a source node of information dissemination is a single source node. On social networks, the network itself is abstracted as a graph structure, and information is disseminated from point to point along edges. In some cases, since only states of some nodes are observed, or only a subgraph formed after a dissemination result occurs is observed, it is impossible to directly determine a node which the information dissemination starts from. Therefore, it is required to trace an information source.

Multi-source information traceability refers to an issue of information traceability when source nodes of information dissemination are a plurality of source nodes. Compared with an information dissemination process initiated by only one source node, an information dissemination process initiated by a plurality of source nodes is more complicated, which brings difficulties to information traceability.

Regardless of single-source information traceability or multi-source information traceability, information transmission of nodes needs to be recorded. In some scenarios, multi-source information may exist, and single-source information may also exist.

For example, a cloud disk for cloud storage may be regarded as a cloud server, and a first terminal needs to save, to the cloud server, a piece of first data that can only be acquired by the first terminal itself. Only two nodes are provided for the first data, and in this case, the source node is only the first terminal. For example, the first terminal sends a piece of second data to the cloud server, and the second data can be forwarded. In this case, the second data is forwarded to a second terminal, and then there are two source nodes, namely the first terminal and the cloud server. The cloud server may process the second data into third data and forward the third data to the second terminal.

Because transmission paths of different source data are different, all types of source data need to be filtered during information traceability, which leads to a relatively large data volume during filtering. The reason is that the source data is not classified based on corresponding scenarios when stored again, which leads to a relatively large volume of data traversed during concurrent processing of a system.

SUMMARY

Embodiments of the present invention provide an information traceability method and system based on a blockchain, which can quickly locate an information source based on different labels in a traceability request during information traceability, reduce a volume of data traversed during searching for the information source, save a time for searching for the information source, and have relatively high efficiency.

According to a first aspect of embodiments of the present invention, an information traceability method based on a blockchain is provided, including:

receiving a traceability request, where the traceability request includes a type label, a time label, and a content label;

accessing information path data pre-stored in the blockchain based on the type label to obtain target path data, where the target path data is single-source path data or multi-source path data;

determining a corresponding primary data set based on the time label, where the target path data includes a plurality of primary data sets;

determining a corresponding secondary data set based on the content label, where the primary data set includes at least one secondary data set; and extracting path information from the secondary data set, and obtaining at least one information source based on the path information.

Optionally, in a possible implementation of the first aspect, single-source path data or multi-source path data is generated by performing the following steps, including:

monitoring a plurality of terminals; and when any terminal generates data and sends the data to another terminal, with the terminal that generates the data as a first source terminal, and with the terminal that receives the data as a first receiving terminal, generating single-source path information based on the first source terminal and the first receiving terminal, and updating the single-source path data based on the single-source path information; or when any terminal generates data and sends the data to another terminal for the first time, with the terminal that generates the data as a first source terminal, and with the terminal that receives the data for the first time as a first receiving terminal, if the first receiving terminal processes the received data and sends processed data to another terminal for the second time, converting the terminal that receives the data for the first time from the first receiving terminal to a second source terminal, and using a terminal that receives the processed data for the second time as a second receiving terminal; and generating multi-source path information based on the first source terminal, the second source terminal, and the second receiving terminal, and updating the multi-source path data based on the multi-source path information.

Optionally, in a possible implementation of the first aspect, the method further includes: pre-configuring a single-source path storage unit and a multi-source path storage unit;

when single-source path information is generated, storing the single-source path information in the single-source path storage unit;

when single-source path information is changed into multi-source path information, deleting the single-source path information before the change from the single-source path storage unit, and storing the multi-source path information after the change in the multi-source path storage unit; and extracting the single-source path data or the multi-source path data based on a single-source label or a multi-source label, where the type label includes the single-source label or the multi-source label.

Optionally, in a possible implementation of the first aspect, the method further includes:
configuring a plurality of time period subunits in the single-source path storage unit and the multi-source path storage unit separately, where each time period subunit has a different time period;
obtaining a first time when a first receiving terminal receives data from single-source path information, and storing the single-source path information in a time period subunit corresponding to the first time; and
obtaining a second time when a second receiving terminal receives data from multi-source path information, and storing the multi-source path information in a time period subunit corresponding to the second time.

Optionally, in a possible implementation of the first aspect, the method further includes: obtaining a total storage capacity configured for path data;
obtaining a current single-source storage capacity and a single-source total storage capacity of the single-source path storage unit at a current moment;
obtaining a current multi-source storage capacity and a multi-source total storage capacity of the multi-source path storage unit at the current moment;
obtaining a generation amount of single-source path information and a generation amount of multi-source path information in a previous preset time period;
generating a storage capacity adjustment trend value based on the generation amount of single-source path information and the generation amount of multi-source path information; and
adjusting the single-source total storage capacity and the multi-source total storage capacity based on the storage capacity adjustment trend value, an overall total storage capacity, the current single-source storage capacity, and the current multi-source storage capacity.

Optionally, in a possible implementation of the first aspect, the generating a storage capacity adjustment trend value based on the generation amount of single-source path information and the generation amount of multi-source path information includes:
calculating the storage capacity adjustment trend value by using the following formula:

$$\begin{cases} x_1 \geq x_2, s_1 = \dfrac{x_1 - x_2}{x_1 + x_2} \cdot k_1 \\ x_1 < x_2, s_2 = \dfrac{x_2 - x_1}{x_1 + x_2} \cdot k_2 \end{cases}$$

where $s_1$ is a first adjustment trend value for increasing the single-source total storage capacity, $s_2$ is a second adjustment trend value for increasing the multi-source total storage capacity, $x_1$ is the generation amount of single-source path information, $x_2$ is the generation amount of multi-source path information, $k_1$ is a first increasing weight value, and $k_2$ is a second increasing weight value.

Optionally, in a possible implementation of the first aspect, the adjusting the single-source total storage capacity and the multi-source total storage capacity based on the storage capacity adjustment trend value, an overall total storage capacity, the current single-source storage capacity, and the current multi-source storage capacity includes:
when it is determined that a direction in which the storage capacity adjustment trend value is adjusted is to increase the single-source total storage capacity, determining a magnitude of increasing the single-source total storage capacity by using the following formula:

$$\begin{cases} h_1 = s_1 \cdot c_1^i \\ \dfrac{c_2^i + h_1}{c_1^i} \leq p_1 \end{cases}$$

where $c_1^i$ is the overall total storage capacity, $c_2^i$ is the single-source total storage capacity, $h_1$ is the magnitude of increasing the single-source total storage capacity, and $p_1$ is a preset first critical value; and
if $$\dfrac{c_2^i + h_1}{c_1^i} > p_1, c_2^i = p_1 \cdot c_1^i,$$

and in this case, the single-source total storage capacity $c_2^i$ is a maximum value;
when it is determined that a direction in which the storage capacity adjustment trend value is adjusted is to increase the multi-source total storage capacity, determining a magnitude of increasing the multi-source total storage capacity by using the following formula:

$$\begin{cases} h_2 = s_2 \cdot c_1^i \\ \dfrac{c_3^i + h_2}{c_1^i} \leq p_2 \end{cases}$$

where $c_3^i$ is the multi-source total storage capacity, $h_2$ is the magnitude of increasing the multi-source total storage capacity, and $p_2$ is a preset second critical value; and
if $$\dfrac{c_3^i + h_2}{c_1^i} > p_2, c_3^i = p_2 \cdot c_1^i,$$

and in this case, the multi-source total storage capacity is a fixed maximum value.

Optionally, in a possible implementation of the first aspect, the method further includes: receiving a magnitude of increasing the single-source total storage capacity that is input by a user or a magnitude of increasing the multi-source total storage capacity that is input by the user; and
based on a quantitative relation between the input magnitude of increasing the single-source total storage capacity, the input magnitude of increasing the multi-source total storage capacity, the calculated magnitude of increasing the single-source total storage capacity, and the calculated magnitude of increasing the multi-source total storage capacity, determining adjustment of the first increasing weight value $k_1$ or the second increasing weight value $k_2$ by using the following formula:

$$\begin{cases} k_3 = k_1\left(1 + \dfrac{h_3 - h_1}{h_1}\right) \\ k_4 = k_2\left(1 + \dfrac{h_4 - h_2}{h_2}\right) \end{cases}$$

where $k_3$ is an adjusted weight value of the first increasing weight value $k_1$, $k_4$ is an adjusted weight value of the second increasing weight value $k_2$, $h_3$ is the input magnitude of increasing the single-source total storage capacity, and $h_4$ is the input magnitude of increasing the multi-source total storage capacity.

According to a second aspect of embodiments of the present invention, an information traceability system based on a blockchain is provided, including:

a receiving module, configured to receive a traceability request, where the traceability request includes a type label, a time label, and a content label;

an access module, configured to access information path data pre-stored in the blockchain based on the type label to obtain target path data, where the target path data is single-source path data or multi-source path data;

a first determining module, configured to determine a corresponding primary data set based on the time label, where the target path data includes a plurality of primary data sets;

a second determining module, configured to determine a corresponding secondary data set based on the content label, where the primary data set includes at least one secondary data set; and an extraction module, configured to extract path information from the secondary data set, and obtain at least one information source based on the path information.

According to a third aspect of embodiments of the present invention, a readable storage medium is provided, where a computer program is stored in the readable storage medium, and the computer program, when executed by a processor, is used to implement the method according to any one of the first aspect and all the possible designs of the first aspect of the present invention.

In the information traceability method and system based on a blockchain according to the present invention, after the traceability request is received, the type label, the time label and the content label are extracted, and a search range of corresponding path data and path information is narrowed gradually based on the various labels. That is, whether searching is performed in single-source path data or multi-source path data is determined based on a type of the path data corresponding to the traceability request, then the primary data set in the corresponding time range is determined based on the time label, and finally the corresponding secondary data set can be obtained by traversing path information and path data in the primary data set based on the content label, to obtain the information source. In the foregoing solution, the path data and path information are first classified to obtain a first set, and then traversal and comparison are performed. This reduces the data volume of the path data during the traversal and comparison, shortens the time for path data searching, and improves efficiency of determining the information source.

In the present invention, single-source path information and multi-source path information are stored in the single-source path storage unit and the multi-source path storage unit respectively, so that the corresponding single-source path data or multi-source path data, and single-source path information or multi-source path information can be directly determined based on the type label after the traceability request is received, and a comparison amount during traversal of the path data and the path information is greatly reduced.

In addition, in the present invention, the terminals are monitored, and whether the corresponding path is multi-source path information or single-source path information is determined by determining data transmission times and a quantity of terminals through which the data is transmitted, so that in the technical solution according to the present invention, the single-source path information and the multi-source path information can be actively extracted, the single-source path data and the multi-source path data can be updated, and automatic entry and classified storage of the information and the data are implemented.

In the present invention, the single-source total storage capacity and the multi-source total storage capacity are dynamically adjusted based on the generation amount of single-source path information and the generation amount of multi-source path information in the previous preset time period, so that in the technical solution according to the present invention, different storage spaces can be configured for the single-source path storage unit and the multi-source path storage unit based on different usage scenarios, thereby meeting requirements for storing single-source path data and multi-source path data.

In the technical solution according to the present invention, the magnitude of increasing the single-source total storage capacity that is actively inputted by the user or the magnitude of increasing the multi-source total storage capacity that is actively inputted by the user are compared with the calculated magnitude of increasing the single-source total storage capacity and the calculated magnitude of increasing the multi-source total storage capacity to obtain the corresponding quantitative relation, and the first increasing weight value $k_1$ or the second increasing weight value $k_2$ is adjusted, thereby ensuring accuracy of calculating the storage capacity adjustment trend value. Therefore, in the technical solution according to the present invention, active learning and update can be performed, so that the single-source path storage unit and the multi-source path storage unit separately have a reasonable storage space, stability of the system is ensured, and utilization of the storage space is maximized.

DESCRIPTION OF EMBODIMENTS

To make the objectives, technical solutions and advantages of the embodiments of the present invention clearer, the technical solutions in the embodiments of the present invention will be described clearly and completely below with reference to the accompanying drawings in the embodiments of the present invention. Obviously, the embodiments described are only some of, rather than all of, the embodiments of the present invention. All other embodiments obtained by a person of ordinary skill in the art based on the embodiments of the present invention without creative efforts shall fall within the protection scope of the present invention.

The terms "first", "second", "third", "fourth", etc. (if any) in the specification, claims, and the foregoing accompanying drawings of the present invention are used to distinguish between similar objects and are not necessarily used to describe a specific order or sequence. It should be understood that data used in such a way may be interchanged under appropriate circumstances so that the embodiments of the present invention described herein can be implemented in an order other than those illustrated or described herein.

It should be understood that in various embodiments of the present invention, sizes of sequence numbers of the processes do not imply the order of execution. The order of performing the processes should be determined based on their function and internal logic, and should not constitute a limitation to the implementation process of the embodiments of the present invention.

It should be understood that, in the present invention, the terms "including" and "having", and any variations thereof, are intended to cover non-exclusive inclusion, for example, a process, method, system, product, or device including a series of steps or units is not necessarily limited to those steps or units explicitly listed, but may include other steps or units not explicitly listed or inherent to these processes, methods, products, or devices.

It should be understood that in the present invention, "a plural of" means two or more. The term "and/or" describes associations between associated objects, and indicates three types of relationships. For example, "A and/or B" may indicate that A exists alone, A and B coexist, or B exists alone. The character "/" generally indicates that the associated objects are in an "or" relationship. "Including A, B, and C" means that A, B and C are all included, "including A, B or C" means that one selected from the group consisting of A, B, and C is included, and "including A, B and/or C" means that any one or any two or the three selected from the group consisting of A, B, and C are included.

It should be understood that in the present invention, "B corresponding to A", "A corresponds to B" or "B corresponds to A" means that B is associated with A, and B can be determined based on A. Determining B based on A does not mean determining B only based on A, but means that B may also be determined based on A and/or other information. Matching between A and B means that a similarity between A and B is greater than or equal to a preset threshold.

Depending on the context, "if" as used herein may be interpreted as "when" or "in response to determining" or "in response to detection".

The technical solution of the present invention is described in detail below with reference to specific embodiments. The following several specific embodiments can be combined with each other, and the same or similar concepts or processes may not be described in detail again in some embodiments.

Figure 1:
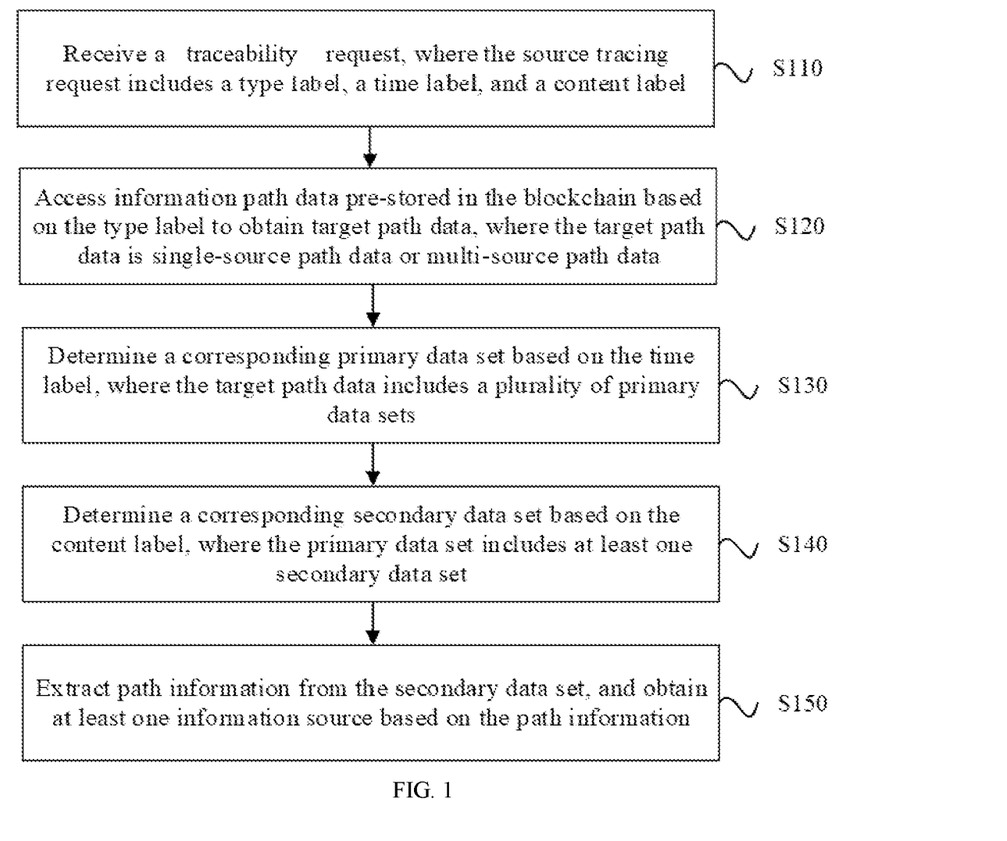
FIG. 1 is a flowchart of a first implementation of an information traceability method based on a blockchain.

As shown in FIG. 1, the present invention provides an information traceability method based on a blockchain. The information traceability method based on a blockchain specifically includes the following steps.

Step S110: Receive a traceability request, where the traceability request includes a type label, a time label, and a content label. In this embodiment of the present invention, a management terminal may send a traceability request to a cloud server, and before sending the traceability request to the cloud server, the management terminal inputs a corresponding traceability information attribute, and the information attribute includes a type label, a time label, a content label, etc. The type label is, for example, a single-source path label or a multi-source path label. The time label is, for example, Dec. 1, 2020. The content label may be a piece of ID information, character information, content information, etc. No limitation is imposed on specific forms of the type label, the time label, and the content label in the present invention.

Step S120: Access information path data pre-stored in the blockchain based on the type label to obtain target path data, where the target path data is single-source path data or multi-source path data. It can be understood that the information path data pre-stored in the blockchain includes single-source path data and multi-source path data, and the target path data is a piece of corresponding data determined from the single-source path data and the multi-source path data based on the type label. The corresponding data may be either single-source path data or multi-source path data, but the target path data cannot be both single-source path data and multi-source path data.

In this embodiment of the present invention, preferably, single-source path data or multi-source path data is generated by performing the following steps, including:

monitoring a plurality of terminals; and when any terminal generates data and sends the data to another terminal, with the terminal that generates the data as a first source terminal, and with the terminal that receives the data as a first receiving terminal, generating single-source path information based on the first source terminal and the first receiving terminal, and updating the single-source path data based on the single-source path information. For example, when a terminal is a warehousing handheld terminal of a supplier, the supplier needs to identify goods during delivery of the goods from storage or warehousing, and sends the identification information and data to a cloud server. In this case, the cloud server stores warehousing data or delivery-from-storage data, and there is a piece of single-source path information, namely terminal-cloud server. In this case, an information source is the warehousing handheld terminal of the supplier. Because handheld terminals may be distributed at different locations and to different persons, based on information held by each handheld terminal, a location at which active entry is performed and a person who performs active entry can be determined. In this case, the information source may be the location and the person corresponding to the handheld terminal. Single-source path information may be in the following form: [first source terminal (warehousing handheld terminal of a supplier)-first receiving terminal (cloud server)]-[00001 milk], and the foregoing information is about the warehousing of the 00001 milk. In this case, the single-source path information is transmission information between the first source terminal and the first receiving terminal.

When any terminal generates data and sends the data to another terminal for the first time, with the terminal that generates the data as a first source terminal, and with the terminal that receives the data for the first time as a first receiving terminal, if the first receiving terminal processes the received data and sends processed data to another terminal for the second time, the terminal that receives the data for the first time is converted from the first receiving terminal to a second source terminal, and a terminal that receives the processed data for the second time is used as a second receiving terminal.

In this scenario, for example, when a terminal is a warehousing handheld terminal of a supplier, the supplier needs to identify goods during delivery of the goods from storage or warehousing, and sends the identification information and data to a cloud server. In this case, the cloud server stores warehousing data or delivery-from-storage data, and there is a piece of single-source path information, namely terminal-cloud server. In this case, an information source is the warehousing handheld terminal of the supplier. Because warehousing handheld terminals may be distributed at different locations and to different persons, based on information held by each handheld terminal, a location at which active entry is performed and a person who performs active entry can be determined. In this case, the information source may be the location and the person corresponding to the handheld terminal. Single-source path information may be in the following form: [first source terminal (warehousing handheld terminal of a supplier)-first receiving terminal (cloud server)]-[00001 milk], and the foregoing information is about the warehousing of the 00001 milk. In this case, the single-source path information is transmission information between the first source terminal and the first receiving terminal. Then, after [00001 milk] is warehoused, some customers may buy [00001 milk] at a location, such as a physical store or an online store. In this case, delivery-from-storage handheld terminals exist. The delivery-from-storage handheld terminals may be distributed at different locations and to different persons. After scanning [00001 milk], the delivery-from-storage handheld terminals receive related information of [00001 Milk] sent thereto by the cloud server. In this case, the delivery-from-storage handheld terminals can record the related information of [00001 Milk], or store the related records in the cloud server or another storage medium, so that multi-source path data is generated.

Multi-source path information is generated based on the first source terminal, the second source terminal, and the second receiving terminal, and the multi-source path data is updated based on the multi-source path information. The multi-source path data may be in the following form: [first source terminal (warehousing handheld terminal of a supplier)-second source terminal (cloud server)-second receiving terminal (delivery-from-storage handheld terminal of the supplier)]-[00001 milk].

The information source includes any one or more of the first source terminal, the second source terminal, the first receiving terminal, and the second receiving terminal. Information sources in the present invention may be different terminals, and different responsible subjects are determined based on the information sources.

For example, if there is a problem with quality of a milk product, the problem may be traced back to a first source terminal (warehousing handheld terminal of a supplier) to determine the location at which the warehousing is performed and the person who performs the warehousing, and then determine a corresponding responsible subject. For example, if a milk product is sold beyond its shelf life, the problem may be caused by negligence of a related person who works for the supplier and who delivers the milk product from storage. In this case, the problem is traced back to a first receiving terminal to determine a corresponding responsible subject.

Figure 2:
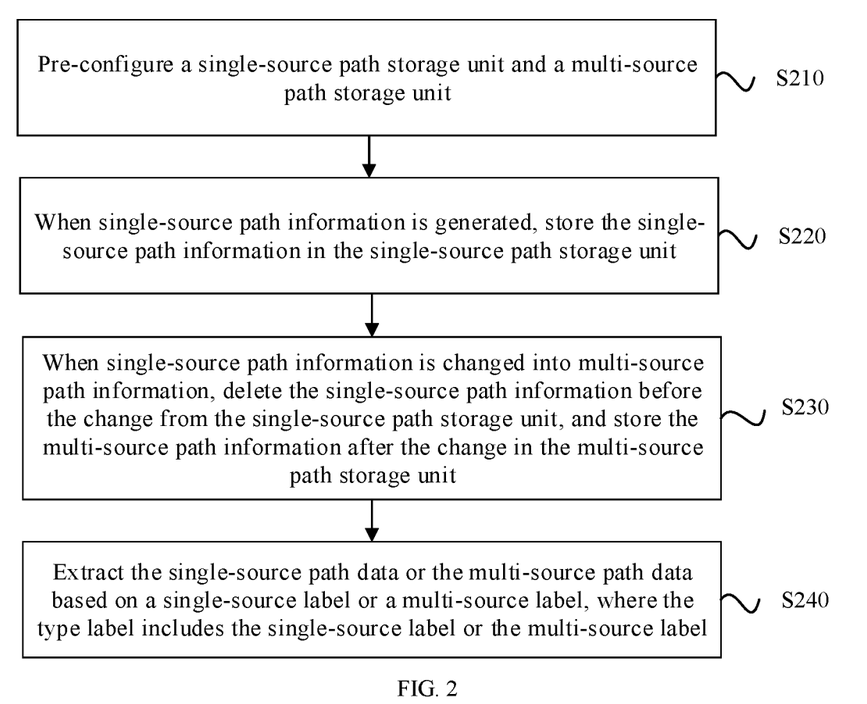
FIG. 2 is a flowchart of a second implementation of an information traceability method based on a blockchain.

In this embodiment of the present invention, preferably, as shown in FIG. 2, the method according to the present invention further includes the following steps.

Step S210: Pre-configure a single-source path storage unit and a multi-source path storage unit. Single-source path information may be stored by the single-source path storage unit, and multi-source path information may be stored by the multi-source path storage unit. In the foregoing scenario of [00001 milk], for example, if only warehousing of [00001 milk] is completed, the related path information may be searched for only in the single-source path information; and for example, if delivery of [00001 milk] from storage is completed, the related path information may be searched for only in the multi-source path information. Compared with a conventional method of sequentially traversing all single-source path information and multi-source path information, this information searching method has the advantage of high efficiency.

Step S220: When single-source path information is generated, store the single-source path information in the single-source path storage unit. In the technical solution of the present invention, path information may be separately stored based on differences, to facilitate subsequent searching directly from target and corresponding path information.

Step S230: When single-source path information is changed into multi-source path information, delete the single-source path information before the change from the single-source path storage unit, and store the multi-source path information after the change in the multi-source path storage unit. Each piece of multi-source path information is obtained through conversion from single-source path information. Therefore, in the present invention, previous single-source path information is deleted when multi-source path information is generated, to ensure a storage space of the single-source path storage unit.

Step S240: Extract the single-source path data or the multi-source path data based on a single-source label or a multi-source label, where the type label includes the single-source label or the multi-source label. In the present invention, a type of a path of an information source that needs to be determined is determined by using the type label. For example, if the searched information source is in single-source path information, the information source corresponds to a single-source label, and if the searched information source is in multi-source path information, the information source corresponds to a multi-source label.

Step S130: Determine a corresponding primary data set based on the time label, where the target path data includes a plurality of primary data sets. In various usage scenarios, there may be different single-source path information and multi-source path information in different usage scenarios, and there is a lot of single-source path information and multi-source path information. In the present invention, time is determined as a classification dimension, and then single-source path information and multi-source path information are classified and segmented again to obtain a primary data set with less information and a smaller data volume. Each piece of primary data has a different time period.

In this embodiment of the present invention, preferably, the method further includes:

configuring a plurality of time period subunits in the single-source path storage unit and the multi-source path storage unit separately, where each time period subunit has a different time period. The time period may be dynamically adjusted based on different usage scenarios. When there is more single-source path information or multi-source path information, a time interval of the time period may be shorter; and when there is less single-source path information or multi-source path information, the time interval of the time period may be longer. The time period can be one time period per month, such as Jan. 1, 2018 to Jan. 13, 2020, . . . , and Aug. 1, 2021 to Aug. 31, 2020. No limitation is imposed on the time interval of the time period in the present invention.

When a time label is Dec. 1, 2020, a corresponding time period is from Dec. 1, 2020 to Dec. 31, 2020. Each time period corresponds to one data set, and each data set may contain one or more pieces of single-source path information and multi-source path information, or may contain neither single-source path information nor multi-source path information. All data sets constitute single-source path data or multi-source path data.

A first time when a first receiving terminal receives data is obtained from single-source path information, and the single-source path information is stored in a time period subunit corresponding to the first time. In the present invention, when a time period corresponding to single-source path information is determined, the first time when the first receiving terminal receives corresponding data and information is determined, and the first time is not determined by using a time when the first source terminal sends and receives data, so that the time corresponding to each piece of single-source path information is determined based on a receiving time of the first receiving terminal.

A second time when a second receiving terminal receives data is obtained from multi-source path information, and the multi-source path information is stored in a time period subunit corresponding to the second time. In the present invention, when a time period corresponding to multi-source path information is determined, the second time when the second receiving terminal receives corresponding data and information is determined, and the second time is not determined by using a time when the first source terminal and the second source terminal sends and receives data, so that the time corresponding to each piece of multi-source path information is determined based on a receiving time of the second receiving terminal.

In addition, the arrangement of the time period subunits facilitates subsequent cleaning and deletion of path data based on time. For example, if path data in a time period is meaningless, to reduce an occupied space, in the present invention, data stored in a corresponding time period subunit can be deleted based on a deletion instruction inputted by an administrator.

Step S140: Determine a corresponding secondary data set based on the content label, where the primary data set includes at least one secondary data set. In the present invention, the primary data is classified and filtered again based on the content label to obtain a secondary data set. The secondary data set may only correspond to one piece of path information, and the path information may be single-source path information or multi-source path information. Determining the corresponding secondary data set by using the content label may be to traverse and compare information content in the content label with each piece of path information in the primary data set.

In the technical solution of the present invention, before the secondary data set is determined, information and data are classified for many times, so that the corresponding primary data set is obtained through filtering according to the classification, and a volume of data in the primary data set is much lower than a total data volume. Therefore, when content labels are sequentially traversed and compared, the volume of sequentially traversed data is reduced, and efficiency of data acquisition and capture is improved.

Step S150: Extract path information from the secondary data set, and obtain at least one information source based on the path information. The information source may be a corresponding terminal, or information of a person corresponding to a terminal, and each terminal corresponds to a unique location and person.

In the present invention, after the secondary data set is obtained, the corresponding path information is obtained. When the secondary data set is single-source path information, the secondary data set may be [first source terminal (warehousing handheld terminal of a supplier)-first receiving terminal (cloud server)]-[00001 milk]. When the secondary data set is multi-source path information, the secondary data set may be [first source terminal (warehousing handheld terminal of a supplier)-second source terminal (cloud server)-second receiving terminal (delivery-from-storage handheld terminal of a supplier)]-[00001 milk]. The information source may be any one or more of the first source terminal, the first receiving terminal, the second source terminal, and the second receiving terminal. The content label may be 00001 milk.

The foregoing method according to the present invention may be completed by a system based on a blockchain structure, that is, broadcasting and accounting are performed each time services such as access and storage occur. It is ensured that the data is tamper-proof and authentic.

In this embodiment of the present invention, preferably, a total storage capacity configured for path data is obtained. Because a data storage capacity of each system is certain, each system configures a different storage capacity for each information storage unit, and in the present invention, a corresponding total storage capacity may be configured for path data based on an actual usage scenario and operation condition.

A current single-source storage capacity and a single-source total storage capacity of the single-source path storage unit at a current moment are obtained. In the technical solution of the present invention, the single-source path storage unit is arranged, so that the single-source path storage unit has the single-source storage capacity and the single-source total storage capacity.

A current multi-source storage capacity and a multi-source total storage capacity of the multi-source path storage unit at the current moment are obtained. In the technical solution of the present invention, the multi-source path storage unit is arranged, so that the multi-source path storage unit has the multi-source storage capacity and the multi-source total storage capacity.

In the present invention, the single-source total storage capacity and the multi-source total storage capacity are pre-configured, so that the single-source path storage unit and the multi-source path storage unit may have appropriate storage spaces at the current moment.

A generation amount of single-source path information and a generation amount of multi-source path information in a previous preset time period are obtained. There are different path information generation results and strategies in different usage scenarios, and corresponding results and strategies are adjusted based on changes in scenarios and time, so that in the present invention, the generation amount of single-source path information and the generation amount of multi-source path information in the previous preset time period need to be first obtained.

A storage capacity adjustment trend value is generated based on the generation amount of single-source path information and the generation amount of multi-source path information. In different scenarios and times, the generation amount of single-source path information and the generation amount of multi-source path information are adjusted, the single-source path information may increase or decrease, and the multi-source path information may increase or decrease. The increase or decrease of the path information causes the occupied space to change, so that in the present invention, the storage capacity adjustment trend value is determined through the increase or decrease of the path information.

The single-source total storage capacity and the multi-source total storage capacity are adjusted based on the storage capacity adjustment trend value, an overall total storage capacity, the current single-source storage capacity, and the current multi-source storage capacity. In the technical solution of the present invention, the single-source total storage capacity and the multi-source total storage capacity are adjusted based on values of multiple dimensions, so that values of the single-source total storage capacity and the multi-source total storage capacity are more in line with a current scenario and meet current requirements of path information and data storage.

In this embodiment of the present invention, preferably, the generating a storage capacity adjustment trend value based on the generation amount of single-source path information and the generation amount of multi-source path information includes:

calculating the storage capacity adjustment trend value by using the following formula:

$$\begin{cases} x_1 \geq x_2, s_1 = \dfrac{x_1 - x_2}{x_1 + x_2} \cdot k_1 \\ x_1 < x_2, s_2 = \dfrac{x_2 - x_1}{x_1 + x_2} \cdot k_2 \end{cases}$$

where $s_1$ is a first adjustment trend value for increasing the single-source total storage capacity, $s_2$ is a second adjustment trend value for increasing the multi-source total storage capacity, $x_1$ is the generation amount of single-source path information, $x_2$ is the generation amount of multi-source path information, $k_1$ is a first increasing weight value, and $k_2$ is a second increasing weight value. $s_1$ and $s_2$ are each a value greater than 0 and less than 1.

The trend value for increasing the single-source total storage capacity when the generation amount of single-source path information is greater than the generation amount of multi-source path information can be calculated by using $$\dfrac{x_1 - x_2}{x_1 + x_2} \cdot k_1;$$

and the trend value for increasing the multi-source total storage capacity when the generation amount of multi-source path information is greater than the generation amount of single-source path information can be calculated by using $$s_2 = \dfrac{x_2 - x_1}{x_1 + x_2} \cdot k_2.$$

$k_1$ and $k_2$ may be adjusted based on an actual scenario. For example, if multi-source path information in a corresponding system has higher importance, the value of $k_1$ may be lowered, and the value of $k_2$ may be increased, so that a change trend of $$\dfrac{x_2 - x_1}{x_1 + x_2}.$$

$k_2$ is greater than that of $$\dfrac{x_1 - x_2}{x_1 + x_2} \cdot k_1,$$

and then a growth trend of the multi-source total storage capacity is greater than that of the single-source total storage capacity.

In this embodiment of the present invention, preferably, the adjusting the single-source total storage capacity and the multi-source total storage capacity based on the storage capacity adjustment trend value, an overall total storage capacity, the current single-source storage capacity, and the current multi-source storage capacity includes:

when it is determined that a direction in which the storage capacity adjustment trend value is adjusted is to increase the single-source total storage capacity, determining a magnitude of increasing the single-source total storage capacity by using the following formula:

$$\begin{cases} h_1 = s_1 \cdot c_1^i \\ \dfrac{c_2^i + h_1}{c_1^i} \leq p_1 \end{cases}$$

where $c_1^i$ is the overall total storage capacity, $c_2^i$ is the single-source total storage capacity, $h_1$ is the magnitude of increasing the single-source total storage capacity, and $p_1$ is a preset first critical value. In the present invention, when the magnitude of increasing the single-source total storage capacity is calculated, the magnitude is adjusted based on the magnitude of the overall total storage capacity, and a larger magnitude of the total storage capacity indicates a larger magnitude of increasing the single-source total storage capacity. However, during the adjustment, the single-source total storage capacity does not increase infinitely, and a first critical value is set, so that a ratio of an adjusted value to the overall total storage capacity must be below the proportion of the first critical value, to ensure that there is a certain magnitude space for the multi-source total storage capacity.

If $$\dfrac{c_2^i + h_1}{c_1^i} > p_1, c_2^i = p_1 \cdot c_1^i,$$

and in this case, the single-source total storage capacity $c_2^i$ is a maximum value. When the ratio of the adjusted value to the overall total storage capacity is above the proportion of the first critical value, it is directly enabled that $c_2^i = p_1 \cdot c_1^i$, and $c_2^i$ is a maximum value.

When it is determined that a direction in which the storage capacity adjustment trend value is adjusted is to increase the multi-source total storage capacity, a magnitude of increasing the multi-source total storage capacity is determined by using the following formula:

$$\begin{cases} h_2 = s_2 \cdot c_1^i \\ \dfrac{c_3^i + h_2}{c_1^i} \leq p_2 \end{cases}$$

where $c_3^i$ is the multi-source total storage capacity, $h_2$ is the magnitude of increasing the multi-source total storage capacity, and $p_2$ is a preset second critical value. In the present invention, when the magnitude of increasing the multi-source total storage capacity is calculated, the magnitude is adjusted based on the magnitude of the overall total storage capacity, and a larger magnitude of the total storage capacity indicates a larger magnitude of increasing the multi-source total storage capacity. However, during the adjustment, the multi-source total storage capacity does not increase infinitely, and a second critical value is set, so that a ratio of an adjusted value to the overall total storage capacity must be below the proportion of the second critical value, to ensure that there is a certain magnitude space for the single-source total storage capacity.

If $$\frac{c_3^i + h_2}{c_1^i} > p_2, c_3^i = p_2 \cdot c_1^i,$$

and in this case, the multi-source total storage capacity is a fixed maximum value. When the ratio of the adjusted value to the overall total storage capacity is above the proportion of the second critical value, it is directly enabled that $c_3^i = p_2 \cdot c_1^i$, and $c_3^i$ is a maximum value.

In this embodiment of the present invention, preferably, a magnitude of increasing the single-source total storage capacity that is input by a user or a magnitude of increasing the multi-source total storage capacity that is input by the user is received. After the magnitude of increasing the single-source total storage capacity or the magnitude of increasing the multi-source total storage capacity is calculated by using the foregoing steps, the administrator may think that the adjusted ratio is not appropriate, and the administrator may actively input the magnitude of increasing the single-source total storage capacity or the magnitude of increasing the multi-source total storage capacity.

Based on a quantitative relation between the input magnitude of increasing the single-source total storage capacity, the input magnitude of increasing the multi-source total storage capacity, the calculated magnitude of increasing the single-source total storage capacity, and the calculated magnitude of increasing the multi-source total storage capacity, adjustment of the first increasing weight value $k_1$ or the second increasing weight value $k_2$ is determined by using the following formula:

$$\begin{cases} k_3 = k_1\left(1 + \frac{h_3 - h_1}{h_1}\right) \\ k_4 = k_2\left(1 + \frac{h_4 - h_2}{h_2}\right) \end{cases}$$

where $k_3$ is an adjusted weight value of the first increasing weight value $k_1$, $k_4$ is an adjusted weight value of the second increasing weight value $k_2$, $h_3$ is the input magnitude of increasing the single-source total storage capacity, and $h_4$ is the input magnitude of increasing the multi-source total storage capacity.

A deviation relationship and an offset distance between $k_3$ input by the administrator and automatically calculated $k_1$ can be reflected and determined by using $$\frac{h_3 - h_1}{h_1},$$

and a deviation relationship and offset distance between $k_4$ input by the administrator and automatically calculated $k_2$ can be reflected and determined by using $$\frac{h_4 - h_2}{h_2}.$$

In the technical solution according to the present invention, the magnitude of increasing the single-source total storage capacity that is actively inputted by the user or the magnitude of increasing the multi-source total storage capacity that is actively inputted by the user are compared with the calculated magnitude of increasing the single-source total storage capacity and the calculated magnitude of increasing the multi-source total storage capacity to obtain the corresponding quantitative relation, and the first increasing weight value $k_1$ or the second increasing weight value $k_2$ is adjusted, thereby ensuring accuracy of calculating the storage capacity adjustment trend value. Therefore, in the technical solution according to the present invention, active learning and update can be performed, so that the single-source path storage unit and the multi-source path storage unit separately have a reasonable storage space, stability of the system is ensured, and utilization of the storage space is maximized.

Figure 3:
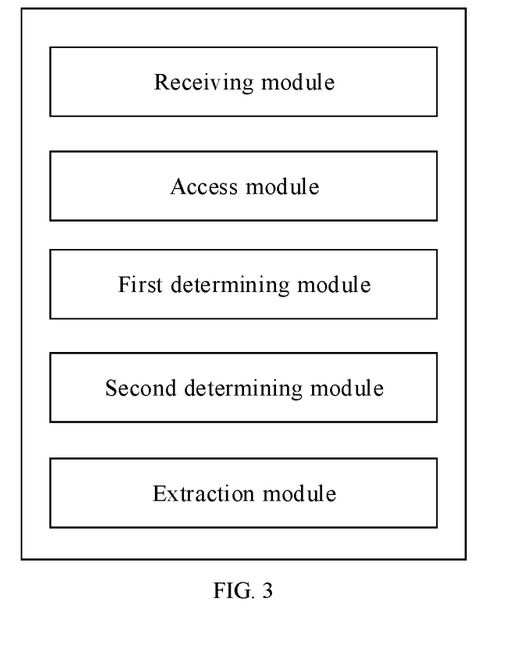
FIG. 3 is a structural diagram of a first implementation of an information traceability system based on a blockchain.

An embodiment of the present invention further provides an information traceability system based on a blockchain, as shown in FIG. 3 which is a schematic structural diagram of the system, including:

a receiving module, configured to receive a traceability request, where the traceability request includes a type label, a time label, and a content label;

an access module, configured to access information path data pre-stored in the blockchain based on the type label to obtain target path data, where the target path data is single-source path data or multi-source path data;

a first determining module, configured to determine a corresponding primary data set based on the time label, where the target path data includes a plurality of primary data sets;

a second determining module, configured to determine a corresponding secondary data set based on the content label, where the primary data set includes at least one secondary data set; and an extraction module, configured to extract path information from the secondary data set, and obtain at least one information source based on the path information.

A readable storage medium may be a computer storage medium or a communication medium. The communication medium includes any medium that facilitates transfer of a computer program from one place to another. The computer storage medium may be any available medium that can be accessed by a general-purpose or special-purpose computer. For example, a readable storage medium is coupled to a processor, so that the processor can read information from the readable storage medium, and can write information to the readable storage medium. Certainly, the readable storage medium may alternatively be an integral part of a processor. The processor and the readable storage medium may be located in an application specific integrated circuit (ASIC). In addition, the ASIC may be located in user equipment. Certainly, the processor and the readable storage medium may alternatively exist in a communication device as discrete assemblies. The readable storage medium may be a read only memory (ROM), a random access memory (RAM), a CD-ROM, a magnetic tape, a floppy disk, an optical data storage device, etc.

The present invention further provides a program product, where the program product includes executable instructions, and the executable instructions are stored in a readable storage medium. At least one processor of a device can read the executable instructions from the readable storage medium, and the at least one processor executes the executable instructions to enable the device to implement the method according to each of the foregoing implementations.

In the foregoing embodiment of the terminal or server, it should be understood that the processor may be a central processing unit (CPU), or may be another general-purpose processor, a digital signal processor (DSP), an application specific integrated circuit (ASIC), etc. The general-purpose processor may be a microprocessor or the processor may be any conventional processor or the like. The steps of the method disclosed in the present invention may be directly embodied as being performed and completed by a hardware processor, or may be performed and completed by a combination of hardware and software modules in the processor.

Finally, it should be noted that the foregoing embodiments are used only to describe the technical solutions of the present invention, and are not intended to limit the present invention. Although the present invention is described in detail with reference to the foregoing embodiments, a person of ordinary skill in the art should understand that he/she can still modify the technical solutions described in each foregoing embodiment, or perform equivalent replacements on some or all of the technical features therein. Such modifications or replacements do not make the essence of the corresponding technical solution depart from the scope of the technical solution of each embodiment of the present invention.

What is claimed is:

1. An information traceability method based on a blockchain, comprising:
    receiving a traceability request, wherein the traceability request comprises a type label, a time label, and a content label;
    accessing information path data pre-stored in the blockchain based on the type label to obtain target path data, wherein the target path data is single-source path data or multi-source path data; further comprising the steps of:
        generating the single-source path data or the multi-source path data by the steps of:
        monitoring a plurality of terminals; and
        when any terminal generates data and sends the data to another terminal, with the terminal that generates the data as a first source terminal, and with the terminal that receives the data as a first receiving terminal, generating single-source path information based on the first source terminal and the first receiving terminal, and updating the single-source path data based on the single-source path information; or
        when any terminal generates data and sends the data to another terminal for the first time, with the terminal that generates the data as a first source terminal, and with the terminal that receives the data for the first time as a first receiving terminal, if the first receiving terminal processes the received data and sends processed data to another terminal for the second time, converting the terminal that receives the data for the first time from the first receiving terminal to a second source terminal, and using a terminal that receives the processed data for the second time as a second receiving terminal; and
        generating multi-source path information based on the first source terminal, the second source terminal, and the second receiving terminal, and updating the multi-source path data based on the multi-source path information, wherein the information source comprises any one or more of the first source terminal, the second source terminal, the first receiving terminal, and the second receiving terminal;
    pre-configuring a single-source path storage unit and a multi-source path storage unit;
        when single-source path information is generated, storing the single-source path information in the single-source path storage unit;
        when the single-source path information is changed into the multi-source path information, deleting the single-source path information before the change from the single-source path storage unit, and storing the multi-source path information after the change in the multi-source path storage unit; and
    extracting the single-source path data or the multi-source path data based on a single-source label or a multi-source label, wherein the type label comprises the single-source label or the multi-source label;
    determining a corresponding primary data set based on the time label, wherein the target path data comprises a plurality of primary data sets;
    determining a corresponding secondary data set based on the content label, wherein the primary data set comprises at least one secondary data set; and
    extracting path information from the secondary data set, and obtaining at least one information source based on the path information.

2. The information traceability method based on a blockchain according to claim 1, further comprising:
    configuring a plurality of time period subunits in the single-source path storage unit and the multi-source path storage unit separately, wherein each time period subunit has a different time period;
    obtaining a first time when a first receiving terminal receives data from single-source path information, and storing the single-source path information in a time period subunit corresponding to the first time; and
    obtaining a second time when a second receiving terminal receives data from multi-source path information, and storing the multi-source path information in a time period subunit corresponding to the second time.

3. The information traceability method based on a blockchain according to claim 1, further comprising:
    obtaining a total storage capacity configured for path data;
    obtaining a current single-source storage capacity and a single-source total storage capacity of the single-source path storage unit at a current moment;
    obtaining a current multi-source storage capacity and a multi-source total storage capacity of the multi-source path storage unit at the current moment;
    obtaining a generation amount of single-source path information and a generation amount of multi-source path information in a previous preset time period;

generating a storage capacity adjustment trend value based on the generation amount of single-source path information and the generation amount of multi-source path information; and adjusting the single-source total storage capacity and the multi-source total storage capacity based on the storage capacity adjustment trend value, an overall total storage capacity, the current single-source storage capacity, and the current multi-source storage capacity.

4. The information traceability method based on a blockchain according to claim 3, wherein the generating a storage capacity adjustment trend value based on the generation amount of single-source path information and the generation amount of multi-source path information comprises:

calculating the storage capacity adjustment trend value by using the following formula:

$$\begin{cases} x_1 \geq x_2, s_1 = \dfrac{x_1 - x_2}{x_1 + x_2} \cdot k_1 \\ x_1 < x_2, s_2 = \dfrac{x_2 - x_1}{x_1 + x_2} \cdot k_2 \end{cases}$$

wherein $s_1$ is a first adjustment trend value for increasing the single-source total storage capacity, $s_2$ is a second adjustment trend value for increasing the multi-source total storage capacity, $x_1$ is the generation amount of single-source path information, $x_2$ is the generation amount of multi-source path information, $k_1$ is a first increasing weight value, and $k_2$ is a second increasing weight value.

5. The information traceability method based on a blockchain according to claim 4, wherein the adjusting the single-source total storage capacity and the multi-source total storage capacity based on the storage capacity adjustment trend value, the overall total storage capacity, the current single-source storage capacity, and the current multi-source storage capacity comprises:

when it is determined that a direction in which the storage capacity adjustment trend value is adjusted is to increase the single-source total storage capacity, determining a magnitude of increasing the single-source total storage capacity by using the following formula:

$$\begin{cases} h_1 = s_1 \cdot c_1^i \\ \dfrac{c_2^i + h_1}{c_1^i} \leq p_1 \end{cases}$$

wherein $c_1^i$ is the overall total storage capacity, $c_2^i$ is the single-source total storage capacity, $h_1$ is the magnitude of increasing the single-source total storage capacity, and $p_1$ is a preset first critical value; and if $$\dfrac{c_2^i + h_1}{c_1^i} > p_1, c_2^i = p_1 \cdot c_1^i,$$

and in this case, the single-source total storage capacity $c_2^i$ is a maximum value;

when it is determined that a direction in which the storage capacity adjustment trend value is adjusted is to increase the multi-source total storage capacity, determining a magnitude of increasing the multi-source total storage capacity by using the following formula:

$$\begin{cases} h_2 = s_2 \cdot c_1^i \\ \dfrac{c_3^i + h_2}{c_1^i} \leq p_2 \end{cases}$$

wherein $c_3^i$ is the multi-source total storage capacity, $h_2$ is the magnitude of increasing the multi-source total storage capacity, and $p_2$ is a preset second critical value; and if $$\dfrac{c_3^i + h_2}{c_1^i} > p_2, c_3^i = p_2 \cdot c_1^i,$$

and in this case, the multi-source total storage capacity is a fixed maximum value.

6. The information traceability method based on a blockchain according to claim 5, further comprising:

receiving a magnitude of increasing the single-source total storage capacity that is input by a user or a magnitude of increasing the multi-source total storage capacity that is input by the user; and based on a quantitative relation between the input magnitude of increasing the single-source total storage capacity, the input magnitude of increasing the multi-source total storage capacity, the calculated magnitude of increasing the single-source total storage capacity, and the calculated magnitude of increasing the multi-source total storage capacity, determining adjustment of the first increasing weight value $k_1$ or the second increasing weight value $k_2$ by using the following formula:

$$\begin{cases} k_3 = k_1\left(1 + \dfrac{h_3 - h_1}{h_1}\right) \\ k_4 = k_2\left(1 + \dfrac{h_4 - h_2}{h_2}\right) \end{cases}$$

wherein $k_3$ is an adjusted weight value of the first increasing weight value $k_1$, $k_4$ is an adjusted weight value of the second increasing weight value $k_2$, $h_3$ is the input magnitude of increasing the single-source total storage capacity, and $h_4$ is the input magnitude of increasing the multi-source total storage capacity.

7. A non-transitory computer readable storage medium, wherein a computer program is stored in the readable storage medium, and the computer program, when executed by a processor, is used to implement the method according to claim 1.

* * * * *